US006327631B1

(12) United States Patent
Eastty et al.

(10) Patent No.: US 6,327,631 B1
(45) Date of Patent: *Dec. 4, 2001

(54) SIGNAL PROCESSING APPARATUS

(75) Inventors: Peter Charles Eastty, Oxford; William Edmund Cranstoun Kentish; Christopher Michael McCulloch, both of Chipping Norton, all of (GB)

(73) Assignees: Sony Corporation, Tokyo (JP); Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/654,217

(22) Filed: May 28, 1996

(30) Foreign Application Priority Data

Jun. 26, 1995 (GB) .................................................. 9513000

(51) Int. Cl.[7] ........................................................ G06F 1/04

(52) U.S. Cl. .......................... 709/400; 709/100; 709/102; 709/106; 709/107; 709/108; 710/244; 710/264; 713/500; 713/502

(58) Field of Search ......................... 395/670; 340/172.5; 709/100, 102, 107, 400; 704/503; 710/244, 264; 713/500, 502

(56) References Cited

U.S. PATENT DOCUMENTS 3,333,252 * 7/1967 Shimabukuro ....................... 710/244
3,421,150 * 1/1969 Quosig et al. ....................... 710/264
3,449,722 * 6/1969 Tucker ................................. 709/103
3,491,339 * 1/1970 Schramel et al. .................... 710/264
3,496,551 * 2/1970 Driscoll et al. ...................... 709/102
3,530,438 * 9/1970 Mellen et al. ....................... 709/100
3,643,227 * 2/1972 Smith et al. ...................... 340/172.5
3,648,253 * 3/1972 Mullery et al. ................... 340/172.5
3,913,070 * 10/1975 Malcolm et al. .
3,916,383 * 10/1975 Malcolm .
4,365,192 * 12/1982 Rankin et al. ......................... 324/72
4,393,465 * 7/1983 Potash .
4,497,023 * 1/1985 Moorer .
5,353,436 * 10/1994 Horst .................................... 709/400
5,384,906 * 1/1995 Horst .................................... 709/400

FOREIGN PATENT DOCUMENTS 2 299 422 A 10/1996 (GB) .

* cited by examiner

*Primary Examiner*—Jessica J. Harrison
*Assistant Examiner*—Yveste G Cherubin
(74) *Attorney, Agent, or Firm*—Frommer Lawrence & Haug LLP; William S. Frommer; Dennis M. Smid

(57) ABSTRACT

A processing apparatus includes a network of interconnected processors comprising a plurality of signal processors for digitally processing input signals in real time to generate output signals and one or more control processors, each control processor controlling the operation of a plurality of signal processors. The processing apparatus automatically schedules control tasks in a plurality of time slices, where more than one control processor is provided for coordination between control processors, a wired-OR configuration connection can be provided to synchronise the beginning and/or end of the time slices. A control processor can change an address field of microcode instructions of a signal processor for implementing a multiplexer function. A control delay list can be provided for scheduling control task delays. Control tasks can be allocated to more than one control processor, each control processor then communicating to the other control processors if it completes the task so that the other control processors may abandon further processing of the task. The invention finds particular application to an audio mixing console.

11 Claims, 8 Drawing Sheets

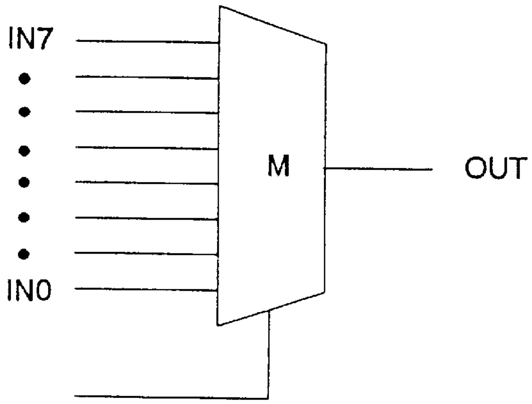
FIG. 9
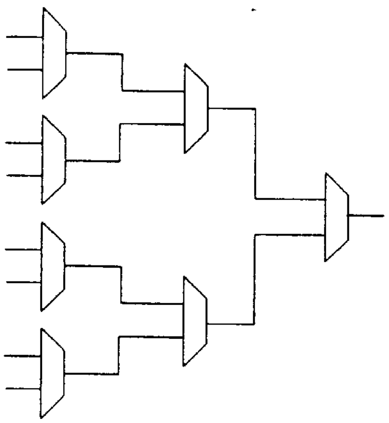
FIG. 9A
| OPCODE | RA | RB | RC | W |
|---|---|---|---|---|
FIG. 10
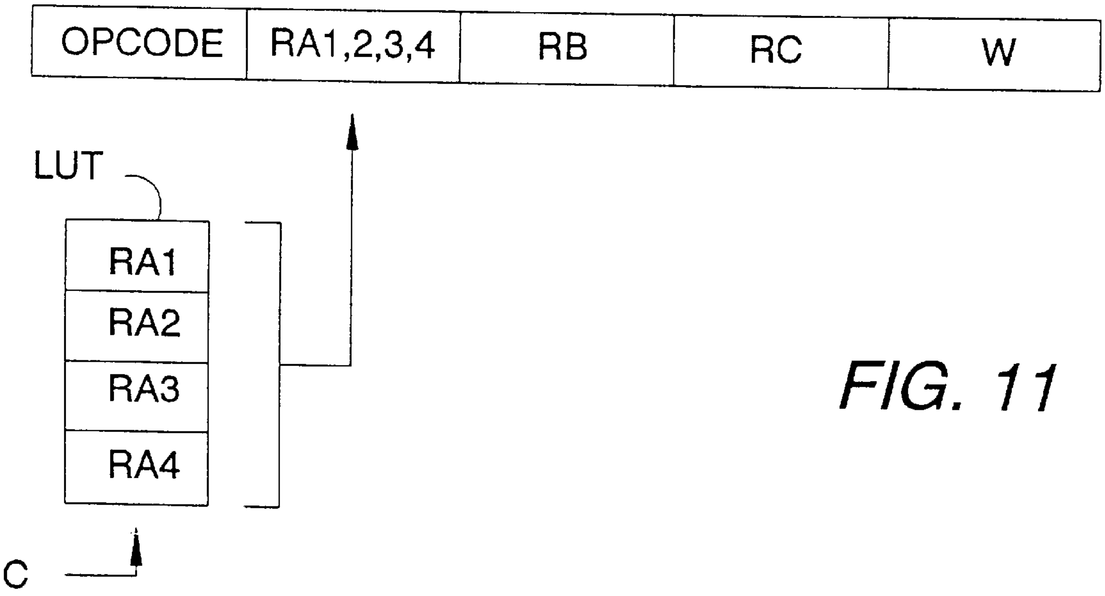
FIG. 11

SIGNAL PROCESSING APPARATUS

BACKGROUND OF THE INVENTION

1. Field of the Invention

This invention relates to processing apparatus for a signal processing network comprising a plurality of interconnected processing units for real time signal processing.

2. Description of the Prior Art

The invention finds particular application for audio signal processing in, for example, an audio mixing console.

Traditionally, audio mixing consoles have been based on discrete technology with audio signal processing modules connected together in a desired relationship and then controlled by manually operable switches on the console. It has been a relatively straightforward task, albeit a skilled and time consuming task, to oversee the physical interconnections necessary during setting up and debugging a desired audio processing structure. However, traditional audio mixing consoles have a number of disadvantages including their physical size, the total number of manually operable controls (fader, potentiometers, switches, etc.), and the relative inflexibility of the overall arrangement.

Accordingly, it has been proposed to provide an audio mixing console comprising a front panel including a plurality of user operable controls for controlling different audio signal processing functions and a digital signal processor for processing audio signals in response to the settings of the user operable controls. It is hoped that such technology can lead to reductions in the overall size of such consoles while at the same time increasing flexibility.

However, in order to be able to process digital audio signals in real time, a highly parallel signal processing structure is required. A problem with the use of a highly parallel processing arrangement for the processing of signals in real time is the scheduling of tasks between the processors and ensuring that the tasks are performed in the correct sequence to avoid, for example, race conditions or signal data, corruption.

SUMMARY OF THE INVENTION

In accordance with one aspect of the invention there is provided processing apparatus for a signal processing system comprising means for inputting and outputting audio signals and a network of interconnected processors comprising a plurality of signal processors for digitally processing input signals in real time to generate output signals and one or more control processors for controlling the operation of the signal processors, the processing apparatus comprising means automatically scheduling control tasks in the control processor(s) in a plurality of time slices.

In one embodiment of the invention, a plurality of control processors operate asynchronously, the means for automatically scheduling time slices including time slice coordination means whereby the control processors communicate to coordinate the execution of successive time slices.

In a preferred embodiment of the invention the time slice coordination means comprises a control line connected in common to each control processor and, in each control processor, means for writing a first binary value to the control line during execution of a task for a time slice, means for writing the opposite binary value to the control line on completion of the task for the time slice and means responsive to the opposite binary value being returned on the control line to indicate that all control processors have completed their tasks for that time slice before commencing the next time slice.

In the preferred embodiment of the invention, the control line is connected to each control processor in a wired-OR configuration and the binary value is a binary one value, the opposite binary value being a binary zero value.

A disadvantage of implementing a complex signal processing structure for processing audio samples on a parallel processing network where a lot of interrelated tasks are to be performed is the need to be able to process tasks at the audio sample rate. This puts a constraint on the number of processing slices which can be processed for each audio sample. A resulting difficulty is that some functions, for example a multiplexer function for selecting between different signal sources dependent on a control input for example, can take a number of slices to perform, reducing the number of slices available for implementing other functions.

In accordance with another aspect of the invention, a signal processor comprises a microcode memory for microcode instructions for the signal processor, and a data memory for signal data representative of a plurality of node input variables and at least one node output variable for a signal processing node to be processed in the signal processor, the microcode instructions including at least one address field for identifying the data memory location for a node input variable, and a control processor comprising means for patching at least one address field in at least one microcode instruction in the microcode memory during processing of audio signals by the apparatus for implementing a multiplexer function to select between a plurality of node input variables.

In a preferred embodiment of the invention, the control processor comprises a table of alternative address fields for the microcode instruction address field, means for selecting one of the alternative address fields dependent upon a selection parameter, and means for patching at least the appropriate address field in the microcode instruction in the microcode memory.

Another aspect of the control of the scheduling of tasks is the scheduling of delays, resulting from variable control inputs for example. In accordance with another aspect of the invention, there is provided means for automatically scheduling delays in a control task sequence, the means for automatically scheduling delays comprising a control delay list, means for inserting tasks to be delayed in delay termination order, and means for comparing at least the delayed task at the head of the list to the current time to determine when the task is to be processed.

Preferably, where control processors are not fully occupied, or for a particularly time critical task, a task may be allocated to more than one control processor, each control processor communicating to the other control processors if it completes the task, whereby the other control processors may abandon further processing of the task.

In a preferred embodiment of the invention the apparatus comprises a graphics generator for generating a graphical representation of a configuration of an audio mixing console and of an audio signal processing structure for processing audio signals in accordance with the configuration of the audio mixing console, the graphics converter being arranged to convert the graphical representation of the audio mixing console and the audio signal processing structure into a connectivity map, the automatic scheduling means being responsive to data derived from the connectivity map for scheduling control and audio processing tasks.

A graphical representation of the data processing structure can be readily interpreted by a user and facilitates the setting up and debugging of the data processing structure. In use, the user can set up the interrelationships necessary and identify locations at which signal values should be input or output. It enables a user to design a data processing structure without actually needing to make the physical connections and enables a design to be fully tested. Also, in use it enables an existing design to be modified or tailored- to particular requirements at will. It will be appreciated that this provides significant technical advantages over a conventional approach. The graphical representation, which can for example be generated using a conventional computer aided design package, can readily be converted by the control unit into a connectivity map using conventional computer aided design tools.

In a preferred embodiment the signal processors operate synchronously, each signal processor synchronously cycling through a predetermined number of processing steps. In this case, means can be provided for interfacing the connectivity map to individual processor cycles at which data values for corresponding positions in the data processing structure are defined. This can be implemented, for example, by compiling appropriate microcode from the connectivity map. Where the signal values for a particular point in the signal processing structure are available at a particular processing step of the cycle and a particular signal processor, this facilitates the automatic generation of a table linking the signal processing structure points to the appropriate time and place in the signal processing network to permit the insertion of and output of data values.

As indicated above, the invention finds particular application to audio processing applications, more particularly for, or in connection with an audio mixing console, where the network comprises a digital signal processing network of an audio mixing console and the data structure comprises a digital audio processing structure of the audio console. Here the network comprises a digital signal processing network of an audio mixing console, audio signals to be processed and control signal values representative of the operation of controls on the console being inserted at and/or output from selected points in the signal processing structure.

It will be appreciated, however, that although the invention finds particular application to the processing of audio signals in the context of an audio signal mixing console, the invention also finds application to other data processing networks where a data processing structure is to be implemented on the network.

BRIEF DESCRIPTION OF THE DRAWINGS

An embodiment of the invention will be described by way of example only with reference to the accompanying drawings in which:

FIGS. 9 and 9*a* are schematic representations of multiplexing operations;

FIG. 10 represents a simplified microcode instruction for the signal processor of FIG. 4;

FIG. 11 is schematic representation of an implementation of the multiplexing function of FIG. 9 in accordance with the invention;

DESCRIPTION OF THE PREFERRED EMBODIMENTS

Figure 1:
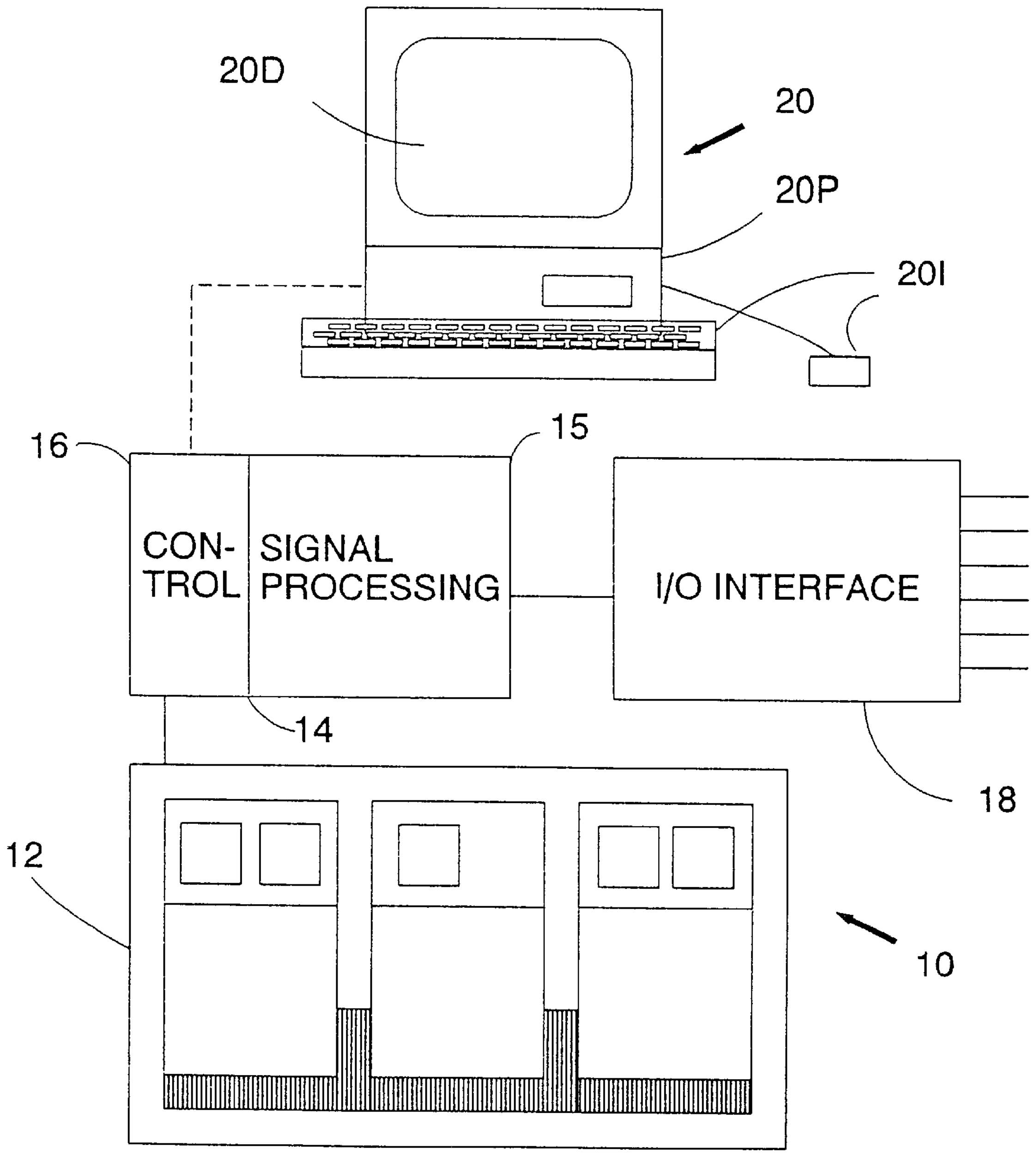
FIG. 1 is a schematic block diagram of a mixing console for audio signal processing.

FIG. 1 represents a simplified schematic block diagram of a mixing console 10 for use in an audio recording studio. The console 10 comprises a front panel 12, a processor network 14 comprising an array of signal processors 15 and one or more control processors and buffer circuitry 16 and one or more input/output interface processors and interfaces 18. Also shown in FIG. 1 is a host unit 20, which could be permanently connected to the remainder of the system, or could be connected only during initialisation and debugging stages of operation.

The panel 12 comprises an array of operator controls including faders, switches, rotary controllers, video display units, lights and other indicators, as represented in a schematic manner in FIG. 1. Operationally the panel 12 can also be provided with a keyboard, tracking device(s), etc. and general purpose processor (not shown) for the input of and control of aspects of the operation of the console. One or more of the video display units on the panel can then be used as the display for the general purpose computer.

In one embodiment, the host unit 20 is implemented as a general purpose workstation incorporating a computer aided design (CAD) package and interface and other software packages for interfacing with the other features of the mixing console. The host unit could alternatively be implemented as a purpose built workstation including special purpose processing circuitry in order to provide the desired functionality, or as a mainframe computer, or part of a computer network. As shown in FIG. 1, the control unit 20 includes a display 20D, user interface devices 20I such as a keyboard, mouse, etc., and a processing and communication unit 20P.

In normal operation, control of the mixing console is performed at the front panel, or mixing desk 12. The mixing console 10 is connected to other devices for the communication of audio and control data between the signal processing network 14 and various input/output devices (not shown) such as, for example, speakers, microphones, recording devices, musical instruments, etc. Operation of the studio network can be controlled at the front panel or mixing desk 12 whereby communication of data between the devices in the studio network and the implementation of the necessary processing functions is performed by the processor network 14 in response to operation of the panel controls.

The processor network 14 can be considered to be divided into a control side 16, which is responsive to the status of the various controls on the front panel 17, and an audio signal processing side 15 which implements the required audio processing functions in dependence upon the control settings and communicates audio data with the studio network via the I/O interface 18.

Figure 2:
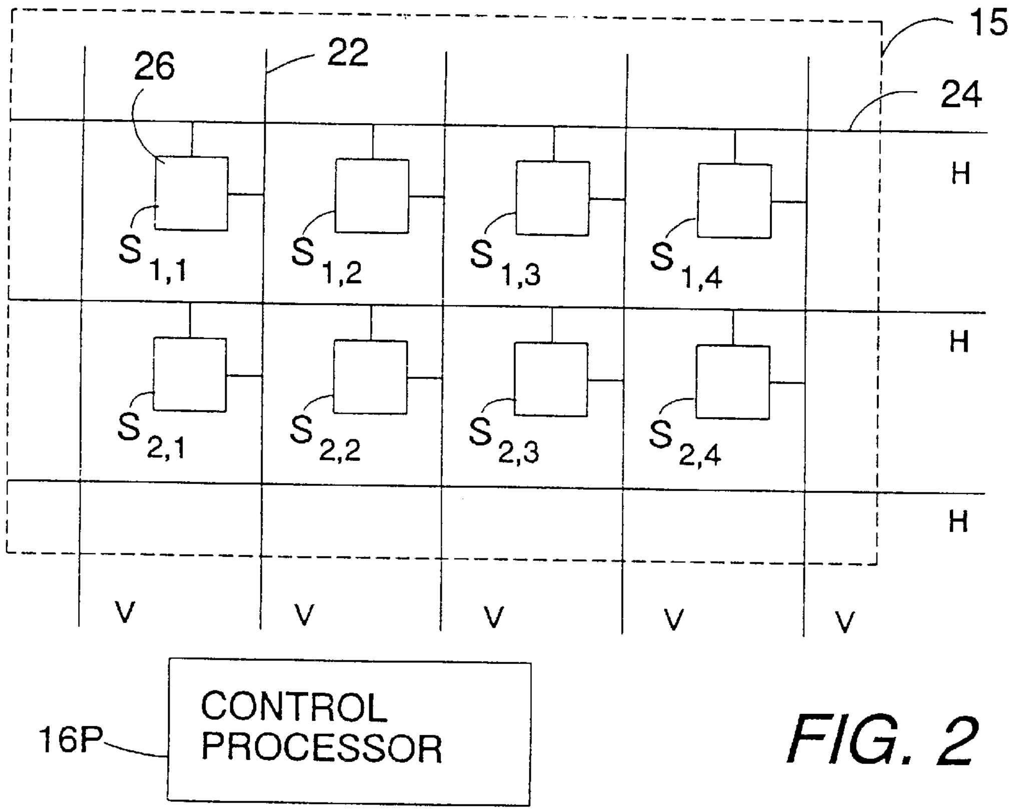
FIG. 2 is a schematic diagram of part of a signal processing network forming part of the mixing console of FIG. 1.

The processing of digital audio data is performed by a parallel signal processing array 15, part of an example of which is illustrated schematically in FIG. 2. This shows an array of 8 signal processing integrated circuits (SPICs) 26 labelled $S_{1.1}$–$S_{2.4}$. The SPICs 26 are arranged, at least from a logical point of view, as an array with each SPIC being connected to a horizontal data bus H and a vertical data bus V. Each SPIC 26 is arranged for communication of data with each of the two buses to which it is connected. As illustrated, each of the horizontal and vertical buses H, V is shared by a number of SPICs 26, but each SPIC in FIG. 2 is connected to a respective pair of buses.

The parallel processing array as a whole consists of a substantially greater number of SPICs than is shown in FIG. 2. In one embodiment the signal processing network is arranged on a rack to which is attached a plurality of cards, each card carrying an array of, for example, 25 SPICs and a control processor, the horizontal and vertical buses being connected between the cards, so that from a logical and electrical point of view, the SPICs form one large array. The buses may be connected in a loop with periodic pipeline registers to allow by-directional communication around the loop and extend the connectivity of the array (see FIG. 5 to be described later).

Figure 3:
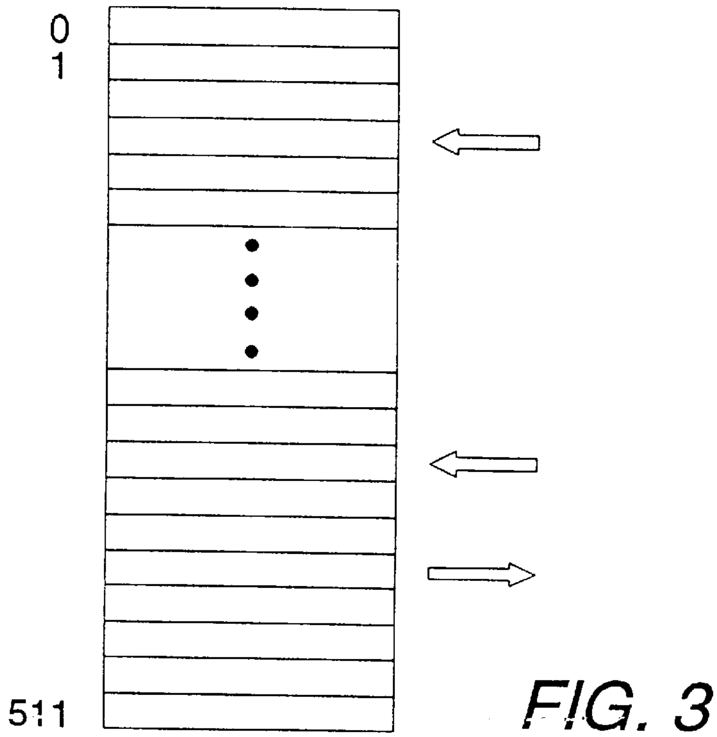
FIG. 3 is a schematic representation of a sequence of instructions performed by a signal processing integrated circuit of the signal processing network.

The SPICs 26 in the array run synchronously, each SPIC performing a sequence of instructions (e.g. 512 instructions as represented schematically in FIG. 3) in each audio sample period in accordance with an instruction sequence stored in an internal memory. The SPICs are pre-programmed with the instruction sequences at set-up so that all possible required processing operations can be implemented by the array. In operation, the SPICs run synchronously through their sequences of instructions under the control of a control processor 16P, which forms part of the control side 16 of the processor network and is responsive to the user operation of the controls on the operator panel 12 to cause the SPICs to implement the various processing operations as required.

It will be appreciated that there is a need to control bus transfer operations between the individual SPICs. In general, all bus transfer occur at pre-arranged times (ticks) in an audio sample period and it will be appreciated that the task of setting those transfer times at the programming stage can be extremely complicated. As the array runs synchronously, only one of the SPICs connected to a given bus can output data to that bus in a given instruction cycle (or tick) of a synchronous clock. Thus, for any data transfer between SPICs and between the SPICs and I/O processes the transfer must be scheduled at a time convenient to the sending SPIC, the receiving SPIC the other SPICs connected to that bus and the I/O interface.

Figure 4:
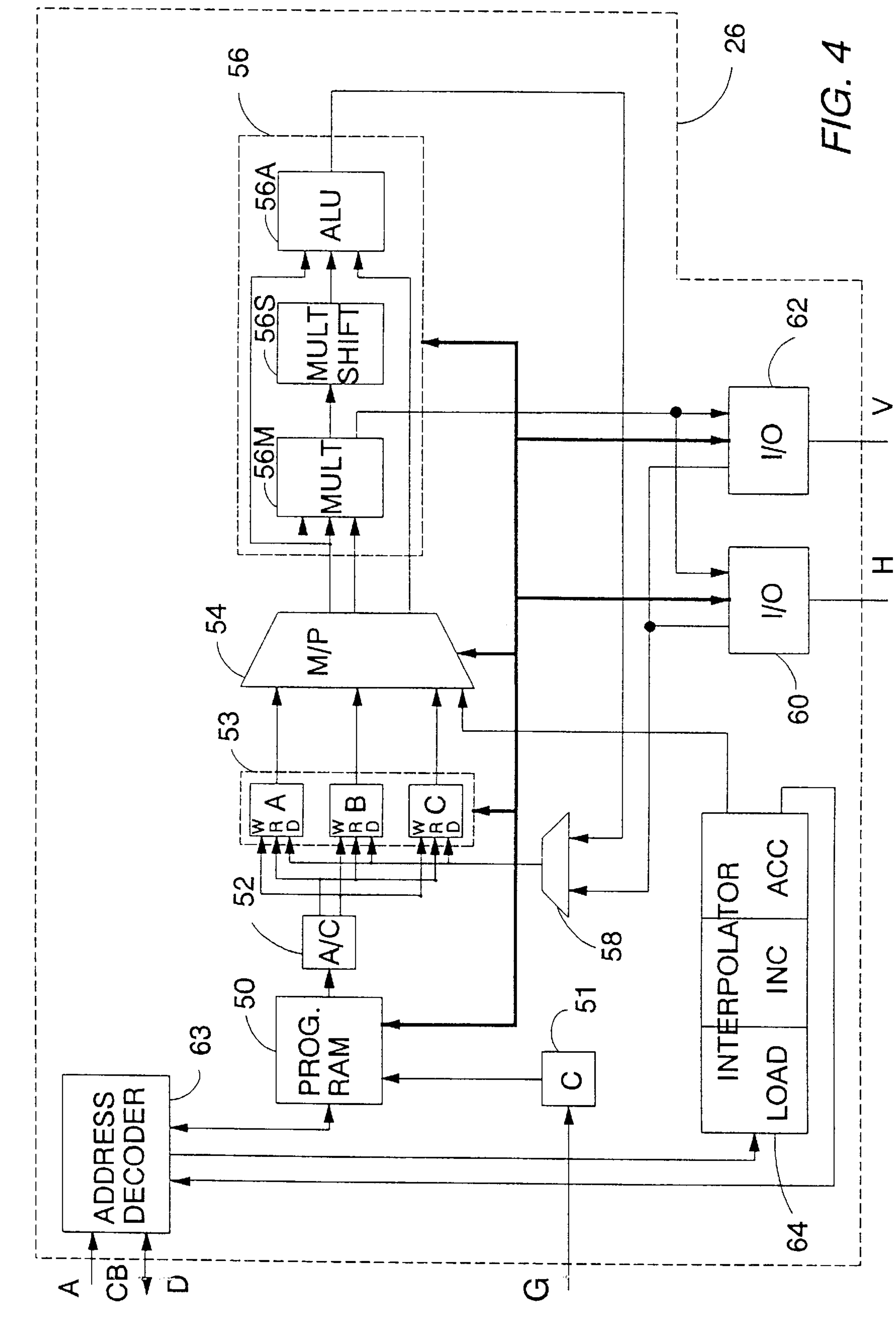
FIG. 4 is a schematic block diagram of one signal processor of the signal processing network of FIG. 3.

FIG. 4 is a simplified block diagram showing the general structure of a signal processing integrated circuit or SPIC 26 which may be used in a parallel processing array as illustrated in FIG. 2.

The SPIC 26 comprises a program RAM 50 in which the instruction sequence for controlling the operation of the SPIC is stored. The program RAM 50 is connected to an address calculator 52 which generates address inputs for a data RAM 53. The data RAM 53 comprises three data RMS 53A, 53B and 53C with respective read and write address inputs R and W and data inputs D. The three data outputs from the data RAMs 53 form three inputs to a multiplexer arrangement 54. A further input to the multiplexer 54 receives coefficients from an interpolator 64 provided separately to the processor 26 as discussed further below.

The multiplexer 54 is arranged to enable the connection of any of its inputs to any of its outputs in dependence upon the instruction being performed. The outputs of the multiplexer 54 form inputs to a data processing unit 56, which includes a multiplier (mult) 56M, a multiplier shifter (mult shift) 56S and an arithmetic and logic unit (ALU) 56A. A further output of the multiplexer 54 is connected to input and output interfaces 60 and 62 for the horizontal and vertical buses to which the SPIC is connected.

The output of the data processing unit 56 and outputs of the I/O units 60 and 62 are connected to respective inputs of an input multiplexer 58, the output of which is connected in turn to a data input of the data RAMs 53.

The control processor 16P, which in the present embodiment is a control processor for a card on which the SPIC 26 is located, is connected to the SPIC 26 in a number of ways for the input and output of control and data values via an address decoder 63. The address A and data D can be supplied from the control processor 16P to the address decoder 63. From there it is connected via a bidirectional connection to the program RAM 50 for the input and output of the control program for the SPIC 26. Also, it is connected via the coefficient interpolator 64 for the input of data coefficient values into the multiplexer 54. Further connections between the control processor and the SPIC 26, which are not relevant to the present invention, may also be provided.

As previously described, each SPIC 26 in the array 15 is programmed at set up time to perform a sequence of operations in each audio sample period in accordance with a sequence of instructions stored in the program RAM 50, the instructions being written to the program RAM 50 of respective SPICs 26 via the control processor(s) 16 at set up time. As shown with respect to FIG. 3, each SPIC 26 can implement 512 such instructions in respective clock periods (ticks) per audio sample period.

In operation, the 512 instructions are sequentially read out of the program RAM 50 in accordance with the clock signal from a counter 51 which generates the 512 clock cycles (ticks) per audio sample period. The counters 51 in the respective SPICs are triggered to start the tick count by a global start sample clock 'G' which runs at the audio sampling frequency. Thus, all SPICs in the array progress synchronously through their respective instruction sequences during each audio sample period.

The parallel processing array as a whole provides for the implementation of all possible processing functions that may be required depending on the configuration of the studio network and the control settings at the front panel 12. To switch in or out a particular function, or to alter the routing of data, the control processor 16P can write directly to the program RAM 50 to change addresses accessed for the data RAM 53. For example, to switch in or out a given function, the address accessed by an instruction corresponding to that function can be changed from an address containing process data to be used when the function is active, to an address containing unprocessed data to be used when the function is switched out.

The connection of the control processor 16P to the coefficient interpolator 64 is used to generate coefficients used in the processing operations of the SPICs. As, for example, panel controllers such as faders, switches, etc., are adjusted by an operator, it is necessary to vary the characteristics such as signal levels, etc., of audio signals. This can be achieved by, for example, multiplying the audio sample data by a coefficient, the value of which corresponds to the setting of a console control. Control data is therefore supplied by the control processor 26 to the interpolator 64 dependent upon the status of the front panel controllers. However since the sampling frequency of digital control signal supplied to the control processor 16P is generally much lower than the audio sampling frequency, for example 1 kHz for the control signals as compared with 48kHz for the audio signals, interpolation is required to generate appropriate coefficient for the multiple audio samples within one period of the control signal sampling frequency. It is this interpolation which is performed by the coefficient interpolator 64 in dependence upon the control data from the control processor 16P. In general, coefficients are generated at half the tick rate so that each coefficient is valued for two successive ticks. The coefficient sample rate can however be adjusted if required for certain functions, such as for cross-fades. The interpolation of a coefficient takes a number of ticks for the load, increment (inc) and accumulate (acc) stages. Coefficients output by the interpolator 64 are applied to an input of the multiplexer 54.

The operation of the SPICs is highly pipelined, with the various stages of operation within the SPICs being performed in successive ticks. Thus, a period elapsed between the commencement of an instruction read out of the program RAM 15 and the time by which that data is available at the output of the data processing unit 56.

In addition, as will be appreciated from the hardware configuration of the processor network, the control and signal processing functions are highly parallel. This invention relates to aspects of the control of the parallel processing functions.

Figure 5:
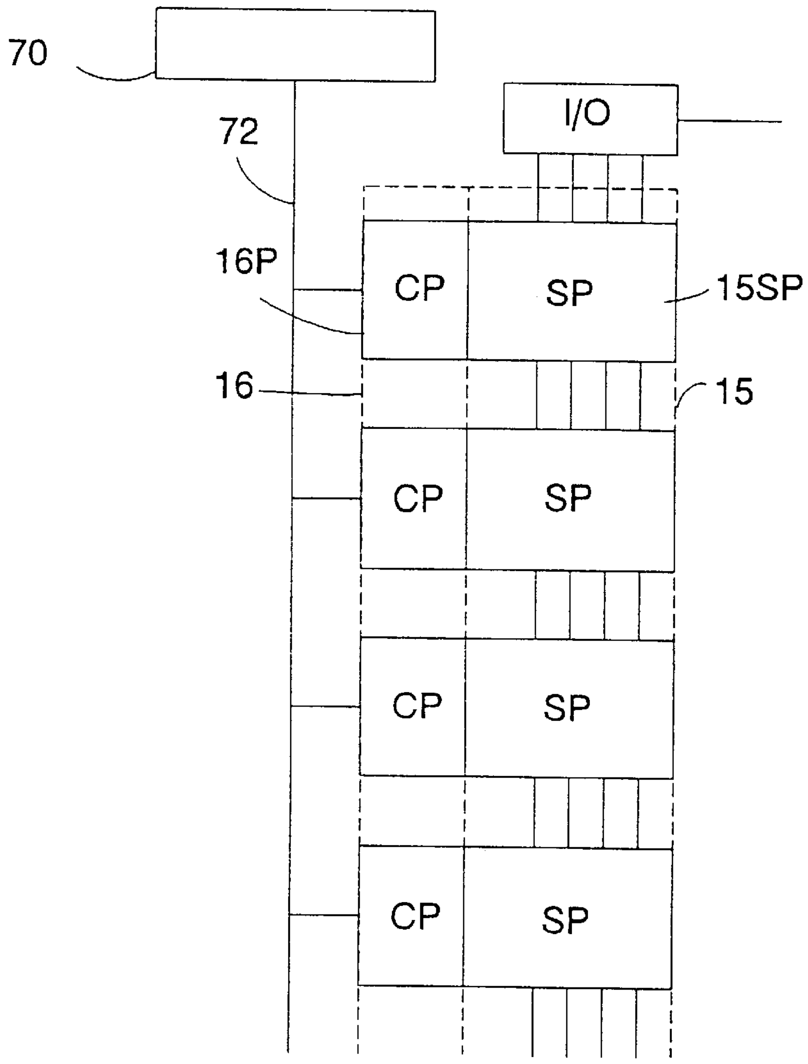
FIG. 5 is schematic representation of the interconnection of a plurality of control processors and signal processing sub-arrays.

FIG. 5 is a schematic diagram illustrating the connection the control and signal processors in an embodiment of the invention. In particular, FIG. 5 illustrates the connection of control processors (CP) 16P on signal processing cards, of which only four are represented in FIG. 5, to via a global interrupt line 72 to a line terminator 70. The operation of the line 72 will be described later. The control processors are not described in detail, these being general purpose microprocessors of conventional design, although it will be appreciated that they could be implemented from special purpose hardware or an ASIC if required.

The signal processing array 15 is formed from the arrays 15SP of SPICs 26 on the individual cards and connected via various signal busses to the I/O interface 18, which can be implemented on one or more cards in the signal processing rack mentioned earlier. Each of the arrays 15SP comprises a plurality of signal processing cards under the control of the control processor on that card. The arrays 15SP combine to form the signal processing network 15 via the signal busses. Not represented in FIG. 5 are the individual signal processors of the arrays 15SP and the connections between the control processor and the individual signal processors, although these correspond to at least those connections illustrated in FIG. 4, and other connections not relevant to an understanding of the present invention.

Figure 6:
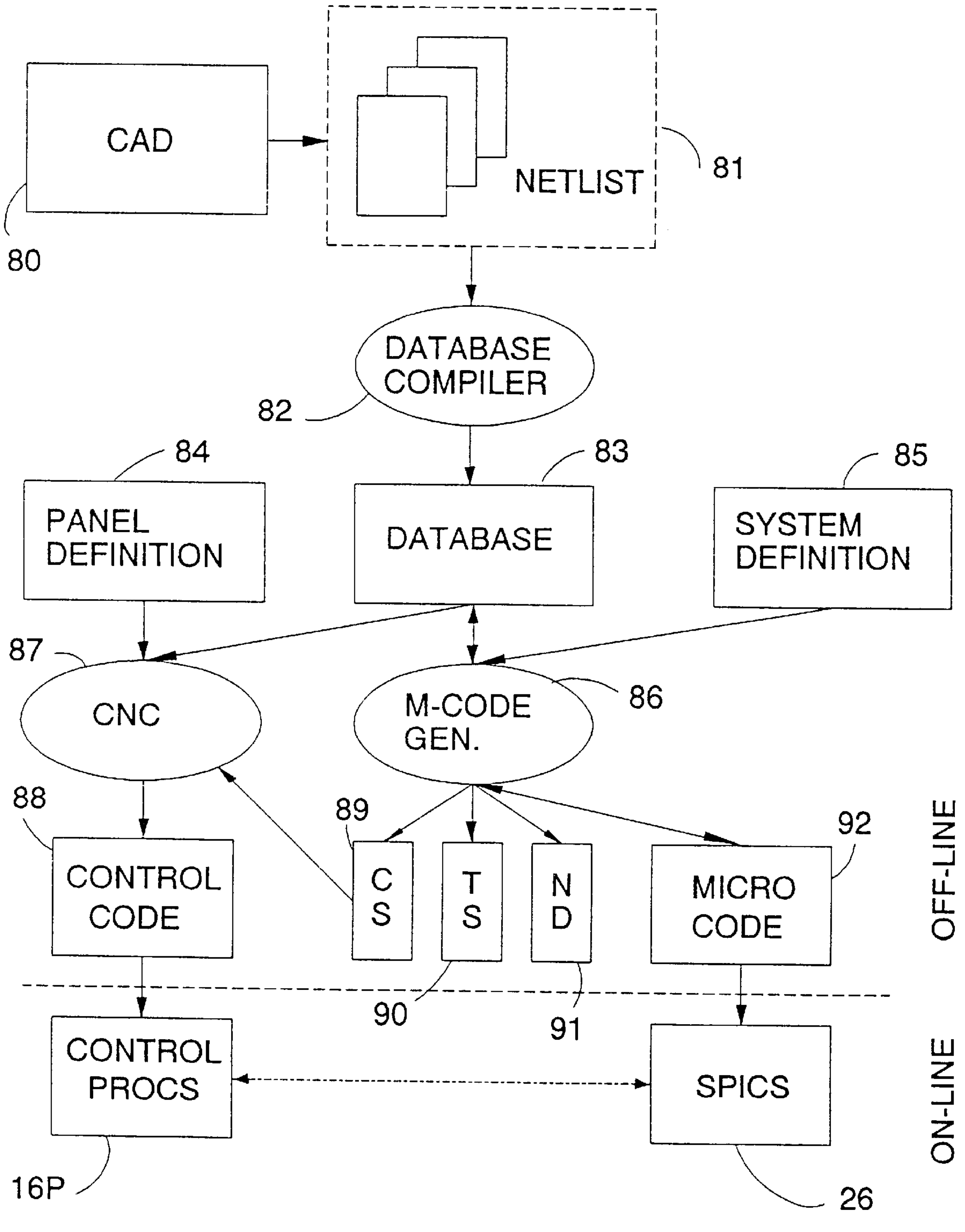
FIG. 6 is a schematic diagram of logic for compiling and running a signal processing structure on the signal processing network of the mixing console of FIG. 1.

FIG. 6 is a schematic block diagram illustrating the configuration of functional elements for programming and/or interacting with the signal processing network 15. FIG. 6 is divided into two sections.

An upper section relates to the functional elements for configuring the signal processing structure to be implemented on the data processing network 14 including the control processor(s) 16P and the SPICs 26. This section is labelled “off-line” as the processes to be described reference to the upper part of FIG. 6 can be performed, if desired, on a general purpose processor without a connection to the processor network.

A lower section relates to the run-time operation of the processor network 14. This section is labelled “on-line” including the control processor(s) 16P and the SPICs 26.

The user configuration can be set up using a design (e.g., a CAD) package 80 on the control processor workstation 20 of FIG. 1. In the following description it will be assumed that this is the case. The design package 80 can be used to generate, in a conventional manner, a representation of an inter-connected network of elements. In the present case, the network of elements can comprise a network of filters, faders, switches, audio inputs, etc. It should be noted that in the present embodiment the network can be described in hierachical form. Thus an element may be defined which in fact include a number of lower order elements. Also, in order to implement one element as defined, a number of lower level operations may need to be performed.

The output of the computer aided design package 80 is a netlist 81 which is stored in the memory of the workstation 20. The netlist 81 comprises a set of data files illustrating the various functional elements of the network and their interconnections.

The netlist 81 is processed by a database compiler 83 to generate a representation of the intended signal processing structure including one or more connectivity table(s) which is then stored on a database 84, for example in the memory of the workstation 20. In this manner, the standard netlist from the computer aided design package 80 can be converted into a form suitable for a particular implementation of the invention. Thus the database contains a definition of the signal processing structure including the signal inputs and outputs, control signal generators such as potentiometers, faders, etc, the processing elements and the interconnectivity of those elements. The data in the database 83 is then used by a microcode generator 86, with data relating to the hardware configuration of the console of FIG. 1 from the system definition store 85, to generate microcode 92 and also a plurality of special tables 89, 90 and 91. These tablets include a coefficient map table CS ’89, a ticks and SPICs table TS 90 and a network definition table ND 91. The microcode is the signal processing microcode which is loaded into the individual SPICs is the signal processing network 15 for carrying out the signal processing operations in order to implement the signal processing structure on the signal processing network.

The coefficient map table 89 identifies SPICs and ticks at which particular coefficients in the signal processing structure are defined. This table, in conjunction with a definition of the control panel from a control panel definition store 84 and the data n the database 83, is then used by a control network compiler 87 to generate control code 88. The control code represents the control programs which are loaded into the control processor(s) 16P for controlling the operating of the arrays of SPICs on the signal processing cards.

The ticks and SPICs table defines the relationship between the lowest level nodes in the signal processing structure and the SPIC which is responsible for processing a particular variable at that node and the tick within the operation of that SPIC at which the data values for that variable are to be input and/or are available within that SPIC. By "lowest level node" is meant an element of the signal processing network description which cannot be further broken down into lower level processing elements. A lowest level node can equate to a few control instructions of the control processor(s) or a SPIC microcode instruction (e.g. add or multiply).

The network definition table ND 91 defines the interconnection of the nodes in the signal processing structure.

By means of the structure illustrated above, complication of the signal processing structure on the signal processing network with the array of SPICs and control processors including programming of the individual control processor (s) 16P and SPICs 26 can be performed.

After compilation, loading of the control and signal processing code into the control processor(s) 16P and the SPICs 26 can occur at an initialisation time. Then signal processing can be performed at run time.

It will be appreciated that the compilation task is very complicated indeed, due to the need to convert from an essentially time independent representation of the signal processing structure produced on the CAD system, to a signal processing structure implemented with many operations being performed in parallel yet other operations by necessity being performed sequentially where, for example, one operation requires the results of another before the operation can be performed.

Figure 7:
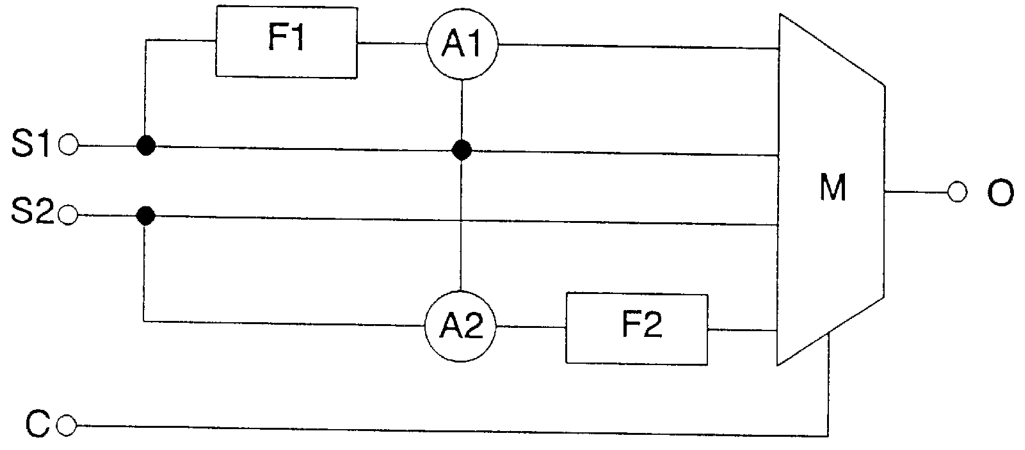
FIG. 7 is a schematic illustration of part of a signal processing structure.

FIG. 7 is schematic representation of a simple signal processing structure as might be generated by a CAD system. The structure represented in FIG. 7, is purely schematic and not intended to represent a real signal processing structure. It includes two signal inputs S1 and S2 and a control input C, first and second filters F1 and F2, two signal adders A1 and A2 and a four-way multiplexer M for selecting one of four signals input thereto in accordance with the value at the control input C. The four inputs to the multiplexer M are (1) the signal S1, (2) the result of passing signal S1 through filter F1, then adding the filtered signal to signal S2, (3) the signal S2, and (4) the result of summing the signals S1 and S2 and then passing the sum through filter F2. It will be appreciated that for a real signal processing application, for example for an audio mixing console, the signal processing structure would stretch to many design screens.

Figure 8:
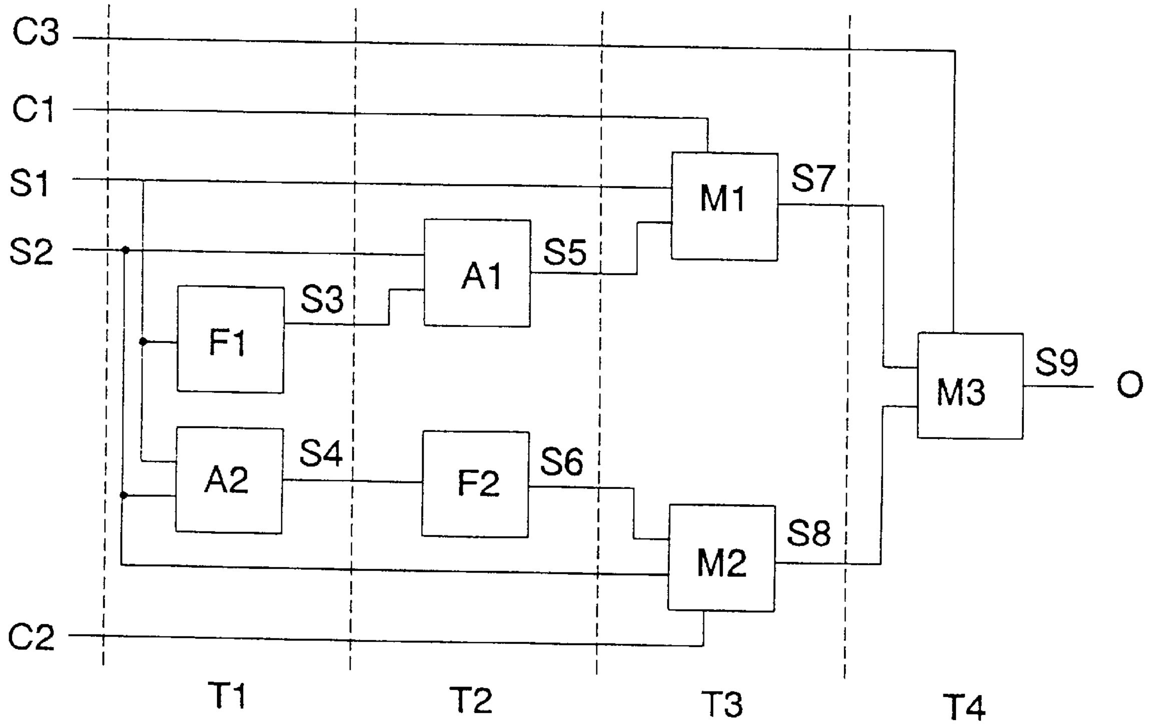
FIG. 8 is a schematic diagram illustrating a sequential implementation of the signal processing structure.

FIG. 8 is a schematic representation of the process flow path for an implementation of the simple signal processing structure of FIG. 7. The processing is performed in four ticks T1–T4. In a tick T1 a signal value S1 is processed in accordance with the filter F1 to give a signal value S3 and the signal value S1 is added to a signal value S2 to give a signal value S4. In tick T2, the signal value S3 is added to the signal value S2 to give a signal value S5, and the signal values S4 is processed in accordance with the filter F2 to give a signal value S6. In tick T3, a selection is made between the signal values S1 and S5 to give a signal value S7 and between the signal values S6 and S2 to give a signal value S8. In tick T4, a selection is made between the signal values S7 and S8 to give an output signal value S9. These processing operations are performed for each audio sample period and in the preferred embodiment are pipelined on a tick basis.

In a real signal processing application, for example for an audio mixing console, the process flow path is vastly more complex, Preferred embodiments of the invention are able to support a process flow path with thousands of inputs and hundreds of time slices in the control domain, although in other embodiments of the invention the process flow path can have more or less inputs and more or less time slices.

Preferably the number of ticks is kept as low as possible in order to reduce the delays between the input of signals and the output of the resulting processed signals. This in turn can lead to constraints on certain functions which it may be necessary to perform. One function which creates difficulties is the multiplexing function. The simple example described in FIGS. 7 and 8 included a four-way multiplexer. In order to implement the four-way multiplexer two ticks were needed. For an eight-way multiplexer (e.g., FIG. 9) three ticks (see FIG. 9*a*) would be needed, for a sixteen way multiplexer four ticks and so on. In read examples it may be desired to use a very large multiplexer with even more inputs, for example for selecting between a number of signal sources. If the conventional approach to implementing such a multiplexer is used (compare FIGS. 8 and 9*a*), particularly where a signal processing structure includes a significant number of such multiplexers, this could severely limit the number of time slices available to implement other signal processing functions required.

In accordance with one aspect of the invention, a solution to the problem is the form a function which will be called the SWIT function hereinafter. The SWIT function takes advantage of aspects of the control and signal processing structure described with reference to FIGS. 1 to 6.

Before describing the SWIT functions, it is useful to look at a simplified microcode instruction format shown in FIG. 10 and used within the SPICs 26. The microcode instructions comprise an operation code OP, three read addresses RA, RB and RC, one each for the data memories 53A, 53B and 53C and a write address W. The 512 microcode instructions executed during each audio simple period by a SPIC are stored in its program RAM 50. At each tick an instruction is read from the program RAM 50 and the wire and read addresses are decoded in the address calculator (A/C) 52 in order to access the appropriate data RAM locations for the operands and for storing the result following processing by the data processing unit 56. For each microcode instruction, only one operand can be read from each of the data RAMs 53A, 53B and 53C. In a conventional implementation, the selection for between only two operands was possible for a multiplexer within any one instruction, the third operand field relating to the control value C.

However, it is possible for the control processor to change instructions or parts thereof during run time. It is this facility which is used in accordance with the invention as will now be described in more detail with reference to FIG. 11.

FIG. 11 illustrates a look-up table LUT in Figure which is stored in the control processor RAM and is accessed by control processor control code. The look-up table LUT contains a plurality of alternative addresses for a selected address field of a patchable microcode instructions for the SPIC. Thus, in this example, the LUT contains alternative addresses which are used for patching into downstream microcode instructions, whereby a separate multiplexer instruction becomes redundant. The LUT is defined in the CS file 89. Each data address relates to the address for a different signal value in the data RAM 53A, corresponding to one of the signal sources which can be selected by the SWIT multiplexer function. Consider in this example the four-way multiplexer of FIG. 8. The four addresses stored in the LUT could correspond to the RAM addresses in the RAM 53A at which the signal values S1, S5, S6 and S2 are stored. The control code in the control processor then includes a SWIT control function which is responsive to the value of the control variable C to select the LUT entry for the appropriate one of the four signal sources identified by the control signal value C and then to write this into an appropriate downstream microcode instructions in the program RAM 50. Then, when the downstream instruction is executed, the data value selected in the RAM 53A is that corresponding to the signal source selected by the control value C. In this embodiment of the invention, the signal values for each of the signal sources which can be selected by the SWIT function must be located within one of the data RAMs 53A, 53B or 53C. However, it is possible for not just one SWIT function to be implemented in one instruction, but for two or three SWIT functions to be implemented, each for a respective one of the data RAMs 53A, 53B and 53C.

It can be seen therefore that the SWIT function enables what would normally be a multistage multiplexer function to be implemented by means of patchable microcode.

One aspect of the processing of the tasks by the various control processors is to ensure that one time slice is completed by each of the control processors before they proceed to process the tasks for the next time slice. This is important as the control processors effectively operate asynchronously and if the timing of the time slices is not performed correctly a race condition could develop where the correct values for a variable are taken before the value in question has been updated at the end of the previous slice.

One example of the manner in which the timing of the time slices can be achieved is through the use of a conventional global semaphore approach. A global semaphore is a memory location (e.g. 70, FIG. 5) which is shared by all the control processors. The global semaphore can be operated in the following manner. That is, when each processor starts processing a particular time slice, it increments the value of the global semaphore. Then, when it finishes processing for that slice it then decrements the semaphore again. When the semaphore reaches zero, the processors known that all of the processors have completed their processing for that time slice and the process can start again for the next time slice.

As an alternative to the control processor incrementing the global semaphore on starting processing for a new time slice, if the number of processors active for that time slice is known, the content of the global semaphore could be set at that number, this then being decremented by each of the processors as it finishes the processing for that time slice. Also it will be appreciated that rather than a decrement to zero regime, the semaphore could reset to some value (e.g., zero) at the start of a time slice and then the processors could modify this in some other way on termination (e.g., incrementing by one) and then the processors could test for some other value having been reached (e.g., n. where n is the number of active processors) to test for the end of the time slice.

It will be appreciated that the global semaphore strategy, while it works perfectly well, requires significant message traffic between the processors and the shared memory location merely to manage the semaphore.

Accordingly, in accordance with one aspect of the invention, a technique, which will be called a "global interrupt". is used.

This is implemented by means of the structure illustrated in FIG. 5, but where each of the control processors 16 is connected to a control line 72, which is in turn connected to a one bit register 70 or simply to a line termination. In operation, when a control processor starts the execution of a task for new time slice it writes a busy signal (e.g., binary one) to the control line and maintains this until the time slice is completed, at which time it writes the opposite binary value (e.g., binary zero) to the control line. When the last control processor writes the opposite binary value to the control line, this causes an interrupt to occur in each control processor connected to the control line to indicate that all the control processors have completed their tasks for that time slice. Only then will the control processors commence the next time slice.

This is conveniently achieved by wiring a connection from each control processor to the control line 72 in a wired-OR configuration such that the value on the line adopts the highest value on the line. Only when all the control processors have written binary zero to the line will the line drop from binary one to binary zero and an interrupt request is generated in each control processor. This provides a secure and simple mechanism for ensuring that the processing for a current time slice has been completed by all the control processors before they move on to process the next time slice.

One aspect of the processing of the signals in the signal processing structure is the efficient distribution of task between the control processors. At any one time a number of task can be allocated to a single control processor. Also, for time slices where less tasks need to be processed than there are processors, a task can be allocated to a number of processors. Depending on the other tasks being performed by the processors at any one time and the additional demands made on the processors, for example as a result of the need to process new coefficient data following user operation of the controls on the front panel, the processor may take different times to complete the task in question. The first processor to complete the task in question can then be arranged to signal to the other processors that they should abandon the further processing of that task. This can be achieved by the passing of messages between processors or a dedicated line where the writing of a binary one to the line indicates that one of the processors has finished processing the task in question.

Another problem in the scheduling of tasks is the scheduling of control signal delays. Such delays can result, for example, from the changing of controllers on the front panel or simply to take account of differing processing time for different tasks which need to be example, to cause a control light to light for a predetermined period. The scheduling of control delays is managed by a control delay function, which will not be described with reference to FIGS. 12 to 14.

The control delay function is responsive to two inputs, which are the value to be delayed (v) and the delay in units of time (dT), and one output (the delayed value). In the processing pass during which control delays are scheduled, the output value is the previous value of the v input, except during initialization, when the value will be zero. If the delay is specified as zero, the signal will be either delayed until the next processing cycle, or the one after the next if there is already a pending delay.

Figure 12:
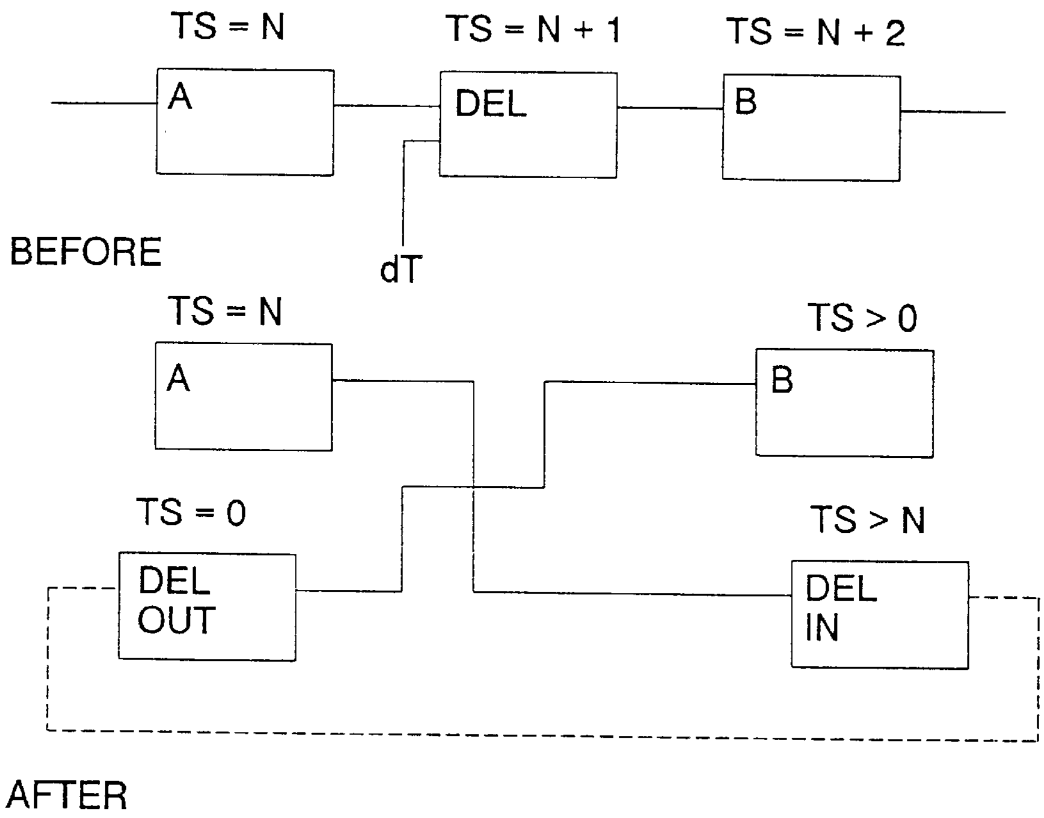
FIG. 12 is a schematic representation of a control delay function.

FIG. 12 gives pre-compilation and run time representations of the implementation of control delay processing. Effectively, the control delays are managed in a linked list in the order in which the values are to be forwarded. In other words, when a new delayed value is added to the list, it is put into the list at a position corresponding to the time it is to be released from the list with respect to the other values in the list.

If the v input changes before a previously delayed valued has appeared at the output, the stored value is output and the new v input is in turn delayed. The second delay is calculated from the time the input changes rather than the time the original delay would have completed.

The overall effect is that the delay is reduced while the input is saturated, but has the advantage that no elements in a data 'stream' are lost (e.g. as a result of up/down key depression).

During initialization, the output of the delay function is zero. During this period, a node will be scheduled once, when it may send a value to be delayed.

If the control delay function is called with the same value to be delayed, but with a different delay time, the signal will not normally be scheduled for a delay. If, however, there is already a pending delay for that signal, the time delay for the pending signal will be recalculated from the time of the second call.

Figure 13:
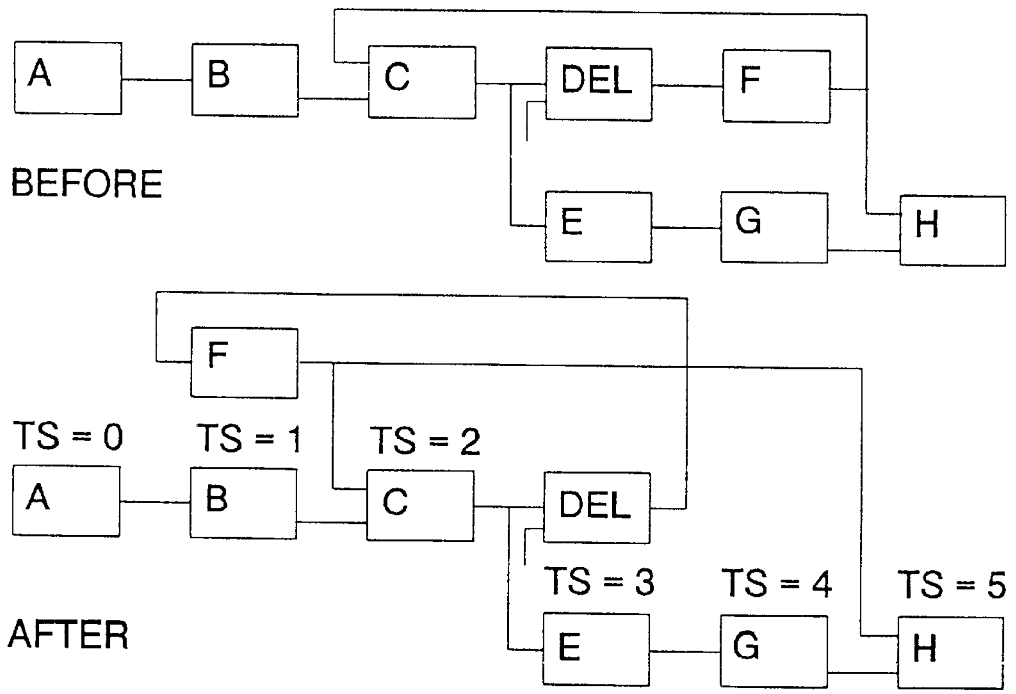
FIG. 13 is a schematic representation of the processing of control delays for a control net.

FIG. 13 gives pre-complication and run-time representations of the correct time-slicing for a control delay function. Where the apparatus determines that it is necessary to (re)schedule a delay, by comparing the current inputs with the current output, pending delay (if appropriate) and previous dT input, and the control delay schedule function is invoked specifying a value to be delayed (v), the delay (dT) and the address (np) of the control delay node's entry in a cnode table. FIG. 13 illustrates an example of the effect of rescheduling a delay which prevents loops which cannot be permitted in the control side because of the danger of cycling.

Figure 14:
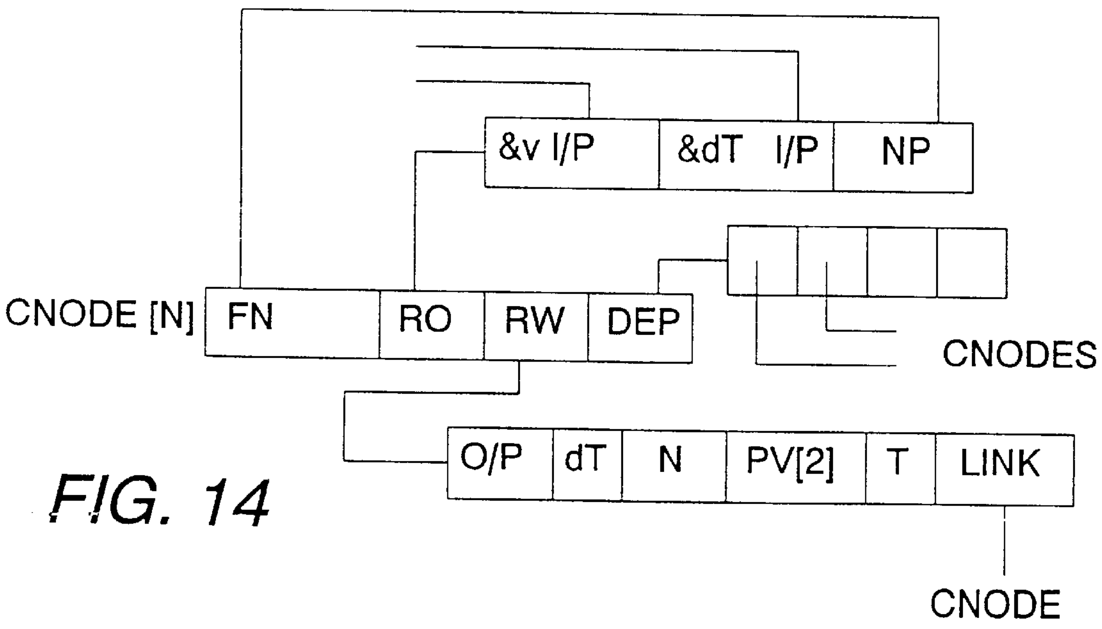
FIG. 14 is a schematic representation of control structures for implementing the control delay function.

FIG. 14 shows the general structure of the control delay nodes data organisation.

The fields in the read-write data-frame are: the current output to the network, the value of the current delay dT input in use, two values being delayed, a count N saying which of the two is to be used the absolute time the delay expires, and a link field.

The scheduler maintains a notion of absolute time (e.g. in milliseconds), which is reset at initialisation time and updated according to the facilitates available in the current operating environment.

In the simplest case, when the control delay scheduler is invoked, the absolute value of the time at which the delay period finishes is calculated, and set in a node's T field. The node is when stored in a time-sorted linked list of all pending control delay nodes. At the start of a cycle, the nodes at the head of this list are compared against the current value of the clock, and if necessary, scheduled. If there are many delays pending at one time, a more sophisticated mechanism of linking/accessing the delayed nodes can be employed with multiple entry points to the list.

The above is also complicated by the fact that there may already be a delay pending for that node, or that the new value is the same as the pending value (a reschedule request), and these conditions must be detected and processed.

In the first case, the action will be to write the new value into the second PV field, increment the N count, and force the time to be equal to the current clock, thus forcing the output to occur next cycle. The scheduler will check the count, and if non-zero, will reschedule the new delay for a time of now+the dT value in the node data frame. In the second case, the action is simply to move the position of the current entry within the linked list.

There has been described various aspects of a signal processing apparatus, including a network of interconnected processing units comprising a plurality of signal processors for digitally processing input signals in real time to generate output signals and one or more control processors, each control processor controlling the operation of a plurality of signal process. The processing apparatus automatically schedules control tasks in a plurality of time slices. Where there are a plurality of control processors, for coordination between control processors, a wired-OR configuration connection can be provided to synchronise the beginning and/or end of the time slices. Also, a global semaphore could b used. A control processor can change an address field of microcode instructions of a signal processor for implementing a multiplexer function. A control delay list can be provided for scheduling control task delays. Control tasks can be allocated to more than one control processor, each control processor then communicating to the other control processors if it completes the task so that the other control processors may abandon further processing of the task. The invention finds particular application to an audio mixing console.

Although particular embodiments of the invention have been described in the present application, it will be appreciated that many modifications and/or additions may be made to the particular embodiments within the spirit and scope of the present invention.

What is claimed is:

1. Processing apparatus for a signal processing system comprising means for inputting and outputting audio signals and a network of interconnected processing units comprising a plurality of signal processors for digitally processing input signals in real time to generate output signals and a plurality of control processors for controlling the operation of said signal processors, said processing apparatus comprising means for automatically scheduling control tasks in said control processor(s) in a number of time slices, in which the automatically scheduling means includes time slice coordination means wherein said control processors communicate to coordinate the execution of successive time slices, in which said time slice coordination means includes a control line connected in common to each control processor, means for writing a busy signal having a first binary value from a respective control processor to said control line at a start of an operation of a respective task for a time slice for each said control processor and for maintaining said busy signal with said first binary value to said control line until completion of the respective task, means for writing a completion signal having a second binary value which is opposite to said first binary value from a respective control processor to said control line on completion of the respective task for the respective time slice for each said control processor, and means, responsive to said opposite binary value being returned on said control line which indicates that all control processors have completed their tasks for said respective time slice, for enabling each said control processor to commence operations for the next time slice.

2. Apparatus according to claim 1, wherein said plurality of control processors operate asynchronously.

3. Apparatus according to claim 1, wherein said control line is connected to each control processor in a wired-OR configuration and said binary value is a binary one value, said opposite binary value being a binary zero value.

4. Apparatus according to claim 1, wherein each signal processor comprises a microcode memory for microcode instructions for said signal processor, and a data memory for signal data representative of a plurality of node input variables and at least one node output variable for a signal processing node to be processed in said signal processor, said microcode instructions including at least one address field for identifying the data memory location for a node input variable, said control processor(s) comprising means for patching at least one address field in at least one microcode instruction in said microcode memory during processing of audio signals by said apparatus for implementing a multiplexer function to select between a plurality of node input variables.

5. Apparatus according to claim 4, wherein the or each control processor comprises a table of alternative address fields for said microcode instruction address field, means for selecting one of said alternative address fields dependent upon a selection parameter, and means for patching at least the appropriate address field in said microcode instruction in said microcode memory.

6. Apparatus according to claim 1, comprising means for automatically scheduling delays in a control task sequence, said means for automatically scheduling delays comprising a control delay list, means for inserting tasks to be delayed in delay termination order, and means for comprising at least said delayed task at the head of said list to the current time to determine when said task is to be processed.

7. Apparatus according to claim 1, which comprises a plurality of control processors, wherein a task may be allocated to more than one control processor, each control processor communicating to said other control processors if it completes said task, whereby said other control processors may abandon further processing of said task.

8. Apparatus according to claim 1, comprising a graphics generator for generating a graphical representation of a configuration of an audio mixing console and of an audio signal processing structure for processing audio signals in accordance with said configuration of said audio mixing console and said graphics converter being arranged to convert said graphical representation of said audio mixing console and said audio signal processing structure into a connectivity map, said automatic scheduling means being responsive to at a derived from said connectivity map for scheduling control and audio processing tasks.

9. Apparatus according to claim 1, wherein signal processors operate synchronously, each signal processor synchronously cycling through a predetermined number of processing steps.

10. Apparatus according to claim 1, wherein said network comprises a digital signal processing network of an audio mixing console, audio signals to be processed and control signal values representative of the operation of controls on said console being inserted at and/or output from selected points in said signal processing structure.

11. Apparatus according to claim 10 comprising an audio mixing console.

* * * * *